United States Patent
Schlesiger et al.

(10) Patent No.: US 6,958,393 B2
(45) Date of Patent: Oct. 25, 2005

(54) CELLULOSE DERIVATIVES HAVING GEL-LIKE RHEOLOGICAL PROPERTIES AND PROCESS FOR THE PREPARATION THEREOF

(75) Inventors: Hartwig Schlesiger, Fallingbostel (DE); Arne Henning Kull, Bomlitz (DE); Erik-Andreas Klohr, Walsrode (DE)

(73) Assignee: Wolff Cellulosics GmbH & Co. KG, Walsrode (DE)

( * ) Notice: Subject to any disclaimer, the term of this patent is extended or adjusted under 35 U.S.C. 154(b) by 0 days.

(21) Appl. No.: 10/626,338

(22) Filed: Jul. 23, 2003

(65) Prior Publication Data

US 2004/0127700 A1 Jul. 1, 2004

(30) Foreign Application Priority Data

Jul. 25, 2002 (DE) ......................... 102 33 788

(51) Int. Cl.$^7$ .................. C08B 11/00; C08B 11/08; C08B 11/193; C08B 15/00
(52) U.S. Cl. .................. 536/56; 536/84; 536/90; 536/91; 536/95; 536/96
(58) Field of Search .................. 536/56, 84, 90, 536/91, 95, 96

(56) References Cited

U.S. PATENT DOCUMENTS

| | | | | |
|---|---|---|---|---|
| 4,175,183 | A | | 11/1979 | Ayers .................. 536/57 |
| 4,321,367 | A | | 3/1982 | Cheng et al. .................. 536/88 |
| 4,474,667 | A | * | 10/1984 | Block .................. 507/114 |
| 6,251,479 | B1 | * | 6/2001 | Groitzsch et al. .................. 427/244 |
| 2002/0038018 | A1 | | 3/2002 | Dannhorn et al. .................. 536/91 |

OTHER PUBLICATIONS

Dannhorn et al. (EP 1180526 A1) (Process for the preparation of alkyl hydroxyalkyl cellulose) (Abstract Sent).*

C.L. Sieglaf: "Proposed Nomenclature for Steady Shear Flow and Linear Viscoelastic Behavior", Transactions of the Society of Rheology 20:2 month unavailable (1976) 311–317.

N. Sarkar: "Kinetics of thermal gelation of methylcellulose and hydroxypropylmethylcellulose in aqueous solutions", Carbohydrate Polymers 25 month unavailable (1995) 195–203.

F. Chambon, H.H., Winter: "Linear Viscoelasticity at the Gel Point of a Crosslinking PDMS with Imbalanced Stoichometry", Journal of Rheology 31 (8) month unavailable (1987) 683–697.

G. Barteimus and R. Ketterer, Z. Anal. Chem. 286 (month unavailable) (1977) 161–190 "Analytik von Cellulosea-ethergruppen".

* cited by examiner

Primary Examiner—Elvis O. Price
Assistant Examiner—Michael C. Henry
(74) Attorney, Agent, or Firm—Joseph C. Gil; James R. Franks

(57) ABSTRACT

A description is given of cellulose derivatives having gel-like rheological properties in aqueous solution characterized in that:
 a) cellulose is alkalized with aqueous alkali metal hydroxide solution in the presence of a suspension medium,
 b) the alkalized cellulose is reacted with one or more alkylene oxides,
 c) then reacted with an alkyl halide present in the suspension medium
 d) subsequently or simultaneously the alkalized cellulose is reacted with a crosslinking agent in an amount of 0.0001 to 0.05 eq, where the unit "eq" represents the molar ratio of crosslinking agent relative to the anhydroglucose unit (AGU) of the cellulose used, and
 e) after, if appropriate, further addition of alkali metal hydroxide and/or alkylating agent, the resultant irreversibly crosslinked cellulose derivative is separated off from the reaction mixture, if appropriate purified and dried.

4 Claims, No Drawings

CELLULOSE DERIVATIVES HAVING GEL-LIKE RHEOLOGICAL PROPERTIES AND PROCESS FOR THE PREPARATION THEREOF

BACKGROUND OF THE INVENTION

1. Field of the Invention

The invention relates to cellulose derivatives having gel-like properties and a process for their preparation.

2. Brief Description of the Prior Art

Cellulose derivatives, owing to their excellent properties and physiological safety, are used widely, for example as thickeners, adhesives, binders and dispersants, water-retention agents, protective colloids, stabilizers and suspension, emulsifying and film-forming agents. Conventional commercially available cellulose derivatives which are soluble in water, for example methylhydroxyethyl cellulose, methylhydroxypropyl cellulose and hydroxyethyl cellulose, exhibit a characteristic rheological profile which may be described on the basis of material functions of the aqueous solution of the cellulose derivative. Aqueous solution in this case denotes a system which comprises water, cellulose derivative and, where there is present, salts and accompanying substances of the cellulose derivative and the water used, for example tap water. Material functions discussed are usually the viscosity $\eta$ as a function of shear rate $\dot{\gamma}$ for describing the flow properties, and the storage modulus $G'$ and the loss modulus $G''$ in each case as a function of the angular frequency $\omega$ for describing linear viscoelastic properties. The symbols used here follow the recommendations of the publication: C. L. Sieglaff: "Proposed Nomenclature for Steady Shear Flow and Linear Viscoelastic Behavior", Transactions of the Society of Rheology 20:2 (1976) 311–317.

In the case of viscosity, generally the complete function $\eta(\dot{\gamma})$ is not given, but a representative viscosity value which is determined under defined conditions with respect to concentration of the cellulose derivative in the aqueous solution, the temperature and the shear rate and also the measuring instrument used and the instrument settings. This procedure is well known to those skilled in the art. It is also generally known that in most cases the viscosity of the aqueous solution of a cellulose derivative decreases with increasing shear rate; the aqueous solutions thus exhibit pseudoplastic flow behaviour.

The linear viscoelastic properties are determined by measurements in an oscillating shear flow at small amplitude and with variable angular frequency. The values for $G'$ and $G''$ are determined to a great extent here by the concentration of the cellulose derivatives in the aqueous solution and the magnitude of the representative viscosity value. Therefore, hereinafter, only the relative course of $G'$ and $G''$ with increasing angular frequency $\omega$ is considered. At a concentration of 1.5 to 2 parts by weight of cellulose derivative per 100 parts by weight of aqueous solution and a temperature of approximately 20° C., the behaviour of $G'$ and $G''$ for the cellulose derivatives of the prior art is such that at a low angular frequency $\omega$, the storage modulus $G'$ is less than the loss modulus $G''$, but with increasing angular frequency $G'$ increases more greatly than $G''$. On occasions, $G'$, above a certain angular frequency, finally becomes greater than $G''$, and the solution at high values of angular frequency thus predominantly reacts elastically.

For conventional cellulose derivatives, in aqueous solution the dependence on the angular frequency is therefore considerably greater for $G'$ than for $G''$. In particular, the linear viscoelastic material functions, storage modulus $G'$ and loss modulus $G''$, in the range of angular frequency $\omega$ of $0.1\ s^{-1}$ to $1\ s^{-1}$ depend on the angular frequency in such a manner that the exponents n and m in the relationships:

(1) $G' \propto \omega^n$ (storage modulus is proportional to the angular frequency to the power of n)

and (2) $G'' \propto \omega^m$ (or (loss modulus is proportional to the angular frequency to the power of m)

differ markedly, wherein the ratio of n to m is greater than 1.20.

Besides the effect of increasing the viscosity, requirements for an optimum setting of the rheological properties of aqueous systems, by the use of cellulose derivatives, can include gel-like properties. Here, for example, methylhydroxyethyl cellulose or methylhydroxypropyl cellulose, which exhibit a thermal flocculation point in water, offer the opportunity of forming gels in a temperature-dependent manner. See N. Sarkar: "Kinetics of thermal gelation of methylcellulose and hydroxypropylmethylcellulose in aqueous solutions", Carbohydrate Polymers 26 (1995) 195–203. The dependence on the angular frequency is no longer markedly greater for $G'$ in gel-like systems than for $G''$.

Achieving gel-like properties by utilizing the thermal flocculation point with setting-defined temperatures involves a marked restriction on the use of cellulose derivatives from two aspects: firstly, it is necessary to, set, with a certain effort, the temperatures suitable for reaching the gel-like properties. Secondly, the selection of the cellulose derivatives is restricted to the products which have a flocculation point in the desired temperature range.

Achieving gel-like properties by partial or-complete replacement of cellulose derivatives by other hydrocolloids which impart gel-like properties is frequently undesirable, since, as a result, certain properties of the cellulose derivatives, for example good water retention, are no longer completely available. Also, such hydrocolloids are generally not based on renewable raw materials or are not biodegradable.

There is therefore a requirement for cellulose derivatives which have gel-like rheological properties in aqueous solution without the addition of other substances or a particular temperature profile being required.

Thus GB 514,917 already describes a process for preparing water-soluble cellulose ethers which are crosslinked with a bifunctional reagent. The purpose of GB 514,917 was to prepare cellulose ethers which have an unusually high viscosity in water. Preferably, the products display a viscosity increase of 400%.

U.S. Pat. No. 4,321,367 also describes a process for preparing crosslinked cellulose ethers, again with the purpose of providing products of increased viscosity in aqueous solution. Preferably, the viscosity of a 2% strength by weight solution is increased by at least 50%; in the most-preferred variant, the viscosity of a 2% strength by weight solution is increased by at least 100%. A surfactant is added, inter alia, as additive to the reaction mixture in order to achieve the distribution of the reactants.

The processes described in these publications are in part multistep, require additional additives such as surfactants, and give only low yields with respect to the crosslinking reagent. The viscosity of the cellulose ethers, compared with the uncrosslinked cellulose ethers is increased extremely greatly, as a result of which the experimental results of such processes are virtually not reproducible.

For these reasons, no commercially usable products have resulted from this group of products.

SUMMARY OF THE INVENTION

It is an object of this invention to develop corresponding cellulose derivatives which have gel-like rheological properties in a solution of 1.5 to 2.0 parts by weight of the cellulose ether per 100 parts by weight of solution at a temperature of 20° C.±1° C., and when water without other additives is used as solvent. More precisely the gel-like properties are to be established directly at the temperature at which the cellulose derivative can be brought into solution. In addition, addition of other substances is not to be necessary in order to obtain the gel-like properties of the solution.

The term "gel-like rheological properties" is here defined by the dependence of the linear viscoelastic material functions, storage modulus G' and loss modulus G" on the angular frequency ($\omega$, on the basis of the definition of the "gel point" known from work by Chambon and Winter [see: F. Chambon, H. H., Winter: "Linear Viscoelasticity at the Gel Point of a Crosslinking PDMS with Imbalanced Stoichometry", Journal of Rheology 31 (8) (1987) 683–697]; there, the gel point is described as the point at which the frequency dependence of G' and G" can be described by the relationships:

(1) $G' \propto \omega^n$ (storage modulus is proportional to the angular frequency to the power of n) and (2) $G'' \propto \omega^m$ (loss modulus is proportional to the angular frequency to the power of m)

and the exponents n and m are identical, or the ratio n to m reaches a value of 1. The values of G' and G" can be different; it is only important that the logarithm of G' and the logarithm of G" plotted in each case against the logarithm of $\omega$ have the same gradient, where here, only the range of angular frequency $\omega$ from $0.1$ $s^{-1}$ to $1$ $s^{-1}$ is considered. Following this definition, the cellulose derivatives having gel-like rheological properties are to have a ratio of n to m which is close to 1 or approaches this value markedly more closely than is the case for conventional cellulose derivatives; in particular, the ratio of n to m should be less than or equal to 1.20. In order to meet the requirement for a ratio of n to m close to 1 uniformly, the ratio of n to m should be greater than or equal to 0.80. The object of this invention is thus to develop cellulose ethers for which the ratio n to in under the conditions described is from 0.80 to 1.20.

This requirement has now surprisingly been met by the preparation of special irreversibly crosslinked cellulose derivatives.

This invention, therefore, relates to cellulose derivatives having gel-like rheological properties in aqueous solution characterized in that:

a) cellulose is alkalized with aqueous alkali metal hydroxide solution in the presence of a suspension medium, b) the alkalized cellulose is reacted with one or more alkylene oxides, c) then reacted with an alkyl halide present in the suspension medium d) subsequently or simultaneously the alkalized cellulose is reacted with a crosslinking agent in an amount of 0.0001 to 0.05 eq, where the unit "eq" represents the molar ratio of crosslinking agent relative to the anhydroglucose unit (AGU) of the cellulose used, and e) after, if appropriate, further addition of alkali metal hydroxide and/or alkylating agent, the resultant irreversibly crosslinked cellulose derivative is separated off from the reaction mixture, if appropriate purified and dried.

DETAILED DESCRIPTION OF THE INVENTION

In a preferred embodiment, the invention comprises cellulose ethers having gel-like rheological properties are distinguished by the fact that the linear viscoelastic material functions, storage modulus G' and loss modulus G" of a solution of 1.5 to 2.0 parts by weight of the cellulose ether per 100 parts by weight of solution at a temperature of 20° C.±1° C., and when water without further additives is used as solvent, in the range of angular frequency $\omega$ from $0.1$ $s^{-1}$ to $1$ $s^{-1}$, are a function of the angular frequency in such a manner that the exponents n and m of the relationships:

(1) $G' \propto \omega_n$ (storage modulus is proportional to the angular frequency to the power n)

and (2) $G'' \propto \omega^m$ (loss modulus is proportional to the angular frequency to the power m)

are approximately identical, where for the cellulose ethers of this invention the ratio of n to m is from 0.80 to 1.20.

The linear viscoelastic material functions, G' and G" of an aqueous solution of the cellulose ethers are determined using a commercially available rotation and oscillation rheometer in the oscillation mode. A rheometer of this type is a measuring instrument through which the association between mechanical deformation and mechanical stress can be determined for a sample, such as a cellulose ether solution, where, depending on the type of rheometer, deformation or tension is preset and the other respective parameter, tension or deformation, is measured. For this, a suitable amount of cellulose ether solution is introduced into the measuring apparatus. Particularly suitable measuring apparatuses are combinations of plate and cone or plate and plate. Measuring apparatuses of beakers and cylinders are in principle also suitable, but because of the generally higher moment of inertia of the rotating body, are not ideal for measurements in the oscillation mode.

For the measurement in the oscillation mode, after charging, the cellulose ether solution is kept at a constant temperature for a time to establish defined boundary conditions for the measurement. The measurement in the oscillation mode is then performed in such a manner that using the rheometer controller, a shear deformation $\gamma^*$ of the sample is established, which shear deformation oscillates sinusoidally in the course of time (time represented by the symbol: t), characterized in that the deformation amplitude $\gamma_0$ and the angular frequency $\omega$:

$$\gamma^* = \gamma_0 \sin(\omega t)$$

The deformation amplitude $\gamma_0$ describes the maximum deformation occurring during the oscillation, that is to say $\gamma^*$ changes during an oscillation cycle between the extreme values $+\gamma_0$ and $-\gamma_0$. The period of a complete oscillation cycle is $2\pi$ multiplied by the reciprocal of the angular frequency $\omega$, that is to say the oscillation is performed in a shorter time, the higher the angular frequency is set.

The mechanical stress $\sigma^*$ produced in this process oscillates with the stress amplitude $\sigma_0$ likewise sinusoidally with time and with the same angular frequency as the deformation $\gamma^*$, but shifted by the phase angle $\delta$:

$$\sigma^* = \sigma_0 \sin(\omega t + \delta)$$

The phase angle, depending on the viscoelastic properties of the sample, takes values between 0 and $\pi/2$, where $\delta = 0$ is the limit case for ideal purely elastic behaviour and $67 = \pi/2$ is the limit case for ideal pure viscous behaviour.

Determination of linear viscoelastic material functions requires that the range of the deformation amplitude $\gamma_0$ is determined in advance, where for the sample under test there is a linear relationship between deformation amplitude and stress amplitude and the phase angle virtually does not change with the deformation amplitude. These conditions are generally readily met if the deformation amplitude is selected sufficiently small.

The data can then be converted directly into the linear viscoelastic material functions storage modulus G' and loss modulus G":

$G' = \sigma_0/\gamma_0 \cos \delta$ (storage modulus is equal to stress amplitude divided by deformation amplitude, multiplied by the cosine of the phase angle)

and $G'' = \sigma_0/\gamma_0 \sin \delta$ (loss modulus is equal to the stress amplitude divided by deformation amplitude, multiplied by the sine of the phase angle)

At a constant temperature, G' and G", for a given cellulose ether solution, are a function only of the angular frequency $\omega$. On the basis of the course of the linear viscoelastic material functions storage modulus G' and loss modulus G" with variation in the angular frequency $\omega$, conventional cellulose ethers and cellulose ethers having gel-like rheological properties can be clearly differentiated.

It has surprisingly been observed that the gel-like rheological properties of the inventive cellulose ethers are found not only for solutions in water without further additives, but also for solutions in a solvent of 98 parts by weight of water and 2 parts by weight of sodium hydroxide per 100 parts by weight of solvent.

The solutions of the inventive cellulose ethers exhibit here, for the exponents n and m of the relationships:

(1) $G' \propto \omega^n$ (storage modulus is proportional to the angular frequency to the power of n)

and (2) $G'' \propto \omega^m$ (loss modulus is proportional to the angular frequency to the power of m)

a ratio of n to m which is in the range from 0.80 to 1.20, in particular from 0.85 to 1.20. For preferred cellulose ethers of this invention, the ratio of n to m is 0.88 to 1.18, particularly preferably from 0.90 to 1.15. Further preferred cellulose ethers have a ratio of n to m of 0.95 to 1.15; the ratio of n to m for the most preferred cellulose ethers is in the range from 0.98 to 1.12.

Also surprising is the only slight effect on the ratio from n to m when the solvent is changed. In this case, the choice of solvents A: Water or B: 98 parts by weight of water and 2 parts by weight of sodium hydroxide per 100 parts by weight of solvent has only a slight effect on the ratio of the two exponents n and m, with the difference in ratio of n to m in solvent A to the ratio of n to m in solvent B under otherwise identical conditions being less than 20 of 100 of the mean of the ratio of n to m in solvent A and the ratio of n to m in solvent B. For preferred cellulose ethers of this invention, the corresponding difference is less than 15 of 100, particularly preferably less than 10 of 100, and for the most preferred cellulose ethers less than 8 of 100, of the mean of the ratio of n to m in solvent A and the ratio of n to m in solvent B. This means that even strong alkaline conditions do not adversely affect the gel-like properties of the products described herein.

This rheological profile can be set by cellulose derivatives which have been irreversibly crosslinked by one or more polyfunctional reagents (also called crosslinking agent). The crosslinking can be carried out before or after the etherification reaction to give the water-soluble cellulose derivative. However, preference is given to simultaneous etherification using reagents subsequently producing water solubility and the crosslinking agent.

In contrast to irreversible crosslinking using a crosslinking agent, reversible crosslinking with aldehydes, for example glyoxal, is abolished again during the dissolution process in water. The inventive irreversibly crosslinked cellulose derivatives can, if appropriate, be additionally reversibly crosslinked, therefore made slow to dissolve.

Crosslinking agents which can be used are polyfunctional compounds, preferably compounds being used which possess halogen groups or epoxy groups or unsaturated groups so that ether bonds are linked in the reaction. Preferably, bifunctional compounds selected from the group consisting of 1,2-dichloroethane, 1,3-dichloropropane, dichlorodiethyl ether, diglycidyl ether, diglycidyl phosphonate, divinyl sulphone are used. Compounds which bear two different functional groups can also be used. Examples of these are glycidyl methacrylate, epichlorohydrin and epibromohydrin. A particularly preferable crosslinking agent is epichlorohydrin.

The amount of crosslinking agent used is 0.0001 to 0.05 eq, where the unit "eq" represents the molar ratio of the respective crosslinking agent relative to the anhydroglucose unit (AGU) of the cellulose unit. The preferred amount of crosslinking agent used is 0.0005 to 0.01 eq. The particularly preferred amount of crosslinking agent used is 0.001 to 0.005 eq.

The inventive cellulose derivatives are preferably cellulose ethers whose water solubility is achieved by etherification with hydroxyalkyl groups and/or with alkyl groups. Preferably, the cellulose derivatives are derivatives of hydroxyethyl cellulose (HEC) or of methyl cellulose (MC). In particular the MC is preferably used as mixed ether with hydroxyalkyl groups (methyl hydroxyalkyl celluloses). Mixed ethers of methyl cellulose which may be mentioned here are, in particular, methyl hydroxyethyl cellulose (MHEC), methyl hydroxypropyl cellulose (MHPC) and methyl hydroxyethyl hydroxypropyl cellulose (MHEHPC).

The alkyl substitution is generally described in cellulose ether chemistry by the DS. The DS is the mean number of substituted OH groups per anhydroglucose unit. The methyl substitution is reported, for example, as DS (methyl) or DS (M).

Usually, the hydroxyalkyl substitution is described by the MS. The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Z. Anal. Chem. 286 (1977)161–190).

If an irreversibly crosslinked HEC is prepared as cellulose derivative, preferably a degree of substitution MS (HE) of 1.5 to 4.5 is set, in particular a degree of substitution MS (HE) of 2.0 to 3.0.

However, preferably, the mixed ethers of methyl cellulose are used for the crosslinking, where in the case of MHEC, preferably DS (M) values of 1.2 to 2.1 and MS (HE) values of 0.05 to 0.75 are set. Particularly preferably, in the case of MHEC DS (M) values of 1.3 to 1.7 and MS (HE) values of 0.15 to 0.45 are set. Most preferably, in the case of MHEC DS (M) values of 1.35 to 1.60 and MS (HE) values of 0.20 to 0.40 are set.

In the case of MHPC as mixed ether of the methyl cellulose, preferably DS (M) values of 1.2 to 2.1 and MS (HP) values of 0.1 to 1.5 are set. Particularly preferably in the case of MHPC DS (M) values of 1.3 to 2.0 and MS (HP) values of 0.2 to 1.2 are set.

Suitable starting materials for the etherification are ground wood pulp and ground linters cellulose or mixtures of these.

The invention also relates to a process for preparing irreversibly crosslinked methylhydroxyalkyl celluloses from cellulose and alkylating agents in the presence of alkali metal hydroxide and one or more suspension media and separating and purifying the reaction products preferably by hot water washing or washing with organic media.

The invention therefore relates to a process for preparing a cellulose derivative, characterized in that
 a) cellulose is alkalized with aqueous alkali metal hydroxide solution in the presence of a suspension medium,
 b) the alkalized cellulose is reacted with one or more alkylene oxides,
 c) then reacted with an alkyl halide present in the suspension medium
 d) subsequently or simultaneously the alkalized cellulose is reacted with a crosslinking agent in an amount of 0.0001 to 0.05 eq, where the unit "eq" represents the molar ratio of crosslinking agent relative to the anhydroglucose unit (AGU) of the cellulose used, and
 e) after, if appropriate, further addition of alkali metal hydroxide and/or alkylating agent, the resultant irreversibly crosslinked cellulose derivative is separated off from the reaction mixture, if appropriate purified and dried.

The cellulose is alkalized (activated) by contacting it with alkali metal hydroxides in aqueous solution, such as sodium hydroxide and potassium hydroxide, preferably using 35 to 60% strength by weight sodium hydroxide solution, particularly preferably 48 to 52% strength by weight sodium hydroxide solution. However, it is also possible to use solid alkali metal hydroxide, for example in the form of granules (prills).

The alkalization is preferably carried out in the presence of suspension media. Suspension media which can be used are dimethyl ether (DME), $C_5$–$C_{10}$-alkanes, for example cyclohexane or pentane, aromatics, for example benzene or toluene, alcohols, for example isopropanol or t-butanol, ketones, for example butanone or pentanone, open-chain or cyclic ethers, for example dimethoxyethane or 1,4-dioxane, and mixtures of the listed suspension media in variable ratios. The particularly preferred suspension medium is dimethyl ether (DME).

If appropriate the suspension medium already comprises during the alkalization portions of the amount of alkylating agent required for the later alkylation, preferably alkyl halide.

Suitable reagents for the alkylation are unbranched or branched $C_1$ to $C_6$ alkyl halides, for example preferably methyl chloride (MCl), ethyl chloride, ethyl bromide and propyl halides, for example propyl iodide. Preference is given to methyl chloride and ethyl chloride, particular preference to methyl chloride. Alkylating reagents having ionic functionalities, for example monochloroacetic acid, N-(2-chloroethyl)diethylamine and vinylsulphonic acid, can equally be used. Suitable reagents for introducing hydroxyalkyl groups are preferably ethylene oxide (EO), propylene oxide (PO), butylene oxide (BO) and acrylonitrile. Particular preference is given to ethylene oxide and propylene oxide.

The alkalized cellulose is then reacted at a temperature above 65° C. with one or more alkylene oxides and the alkyl halide, preferably methyl chloride, present in the suspension medium.

The alkalized cellulose is simultaneously reacted with one or more polyfunctional reagents. The crosslinking agent can be added to the reaction mixture at various time points. Thus it is possible to add it before, during or after the alkalization, and also during the heating-up phase or in the hydroxyalkylation phase. Preferably, the crosslinking agent is added to the reaction mixture before or after the alkalization.

The crosslinking agent can be added in pure form or diluted with inert suspension medium or diluted with alkyl halide or hydroxyalkylating agent. Preferably, the crosslinking agent is added dissolved in inert suspension medium or dissolved in methyl chloride or a mixture of inert suspension medium and methyl chloride.

Following the hydroxyalkylation, in particular alkyl halide is added in amounts of at least the difference between the amount of alkyl halide equivalents already added per AGU and the total amount of alkali metal hydroxide added per AGU, this amount being a minimum of 0.2 equivalents per AGU. If appropriate, further alkali metal hydroxide, preferably used as aqueous alkali metal hydroxide solution, is added, in which case it is also possible to add the alkali metal hydroxide before adding the second amount of alkyl halide.

When methyl chloride (MCl) is used, hereinafter the first amount of alkyl halide introduced with the suspension medium is also called MCl I, and the second amount of alkyl halide added subsequently to the hydroxyalkylation is also termed MCl II.

The resultant cellulose derivative is isolated from the reaction mixture and if appropriate purified.

The cellulose derivative is then converted into a pulverulent product using methods according to the prior art.

When the process is carried out in practice, ground or fibrillated cellulose is generally charged under inert conditions. The cellulosic substrate is then suspended in a mixture of DME/MCl I, the ratio DME/MCl I being 90/10 to 20/80 parts by weight, preferably 80/20 to 40/60 parts by weight, and particularly preferably 70/30 to 50/50 parts by weight. The amount of MCl I in the first process step is characterized as follows, where the unit "eq" represents the molar ratio of the respective starting material relative to the anhydroglucose unit (AGU) of the cellulose used: As a minimum eq MCl I=eq NaOH per AGU minus 1.4, and as a maximum eq MCl I=eq NaOH per AGU plus 0.8. The preferred amount of MCl I in the first process step is: as a minimum eq MCl I=eq NaOH per AGU minus 1.0 and as a maximum eq MCl I=eq NaOH per AGU plus 0.3. The particularly preferred amount of MCl I in the first process step is: as a minimum eq MCl I=eq NaOH per AGU minus 0.5 and as a maximum eq MCl I=eq NaOH per AGU plus 0.1. The most preferred amount of MCl I in the first process step is as a minimum eq MCl I=eq NaOH per AGU minus 0.5 and as a maximum eq MCl I=eq NaOH per AGU minus 0.1.

The crosslinking agent epichlorohydrin is preferably dissolved in MCl or DME/MCl mixture and added to the reaction mixture together with the remaining suspension medium. The amount of MCl or DME/MCl mixture used to dissolve the crosslinking agent is preferably withheld from the suspension medium beforehand.

The cellulose used is alkalized using 1.5 to 5.5 eq of NaOH per AGU, preferably using 1.9 to 3.0 eq of NaOH per AGU, particularly preferably using 2.2 to 2.9 eq of NaOH per AGU. Generally, the alkalization is carried out at temperatures of 15 to 50° C., preferably approximately 40° C., and from 20 to 80 minutes, preferably for 30 to 60 minutes. Preferably, the NaOH is used in the form of a 35 to 60 percent strength by weight aqueous solution, particularly preferably as 48 to 52% strength by weight sodium hydroxide solution.

After the alkalization phase, the hydroxyalkylating agent, for example propylene oxide (PO) or ethylene oxide (EO) is added and the reaction is thermally forced if appropriate by heating. The hydroxyalkylating agent can also be added during the heating-up phase. The reaction with the hydroxyalkylating agent, the crosslinking agent and MCI I proceeds, for example, at 60 to 110° C., preferably at 70 to 90° C., particularly preferably at 75 to 85° C. Depending on the desired degree of substitution, the amount of hydroxyalkylating agent added is adjusted specifically. The amount of hydroxyalkylating agent to be used is from 0.1 to 5 eq per AGU, preferably 0.2 to 2.5 eq per AGU. The alkylene oxide can be added to the reaction system in one addition step, or, in portions, in a plurality of addition steps, preferably it is added in one step, particularly preferably in one step directly following the alkalization phase.

After the first etherification phase, without significant cooling, the amount of MCI II required for the desired substitution of methyl groups is added, which amount is characterized as follows: as a minimum eq MCI II=eq NaOH minus eq MCI I plus 0.3, or as a minimum eq MCI II=0.2 eq MCI per AGU, if the amount of MCI II calculated from the preceding formula is less than 0.2 eq of MCI per AGU. Preferably, eq MCI II=1 to 3.5 eq MCI per AGU are used, particularly preferably eq MCI II=1.5 to 2.5 eq MCI per AGU. The amount of MCI II is added at a temperature above 65° C., preferably at 75 to 90° C., or at the temperature which prevails at the end of the hydroxyalkylation phase. If appropriate, further alkali metal hydroxide, preferably used as aqueous alkali metal hydroxide solution, is added, in which case the alkali metal hydroxide can also be added before addition of the amount of MCI II.

After the end of the second etherification phase, all volatile constituents are removed by distillation, if appropriate under reduced pressure. The resultant product is purified, dried and ground using prior art methods customary in cellulose derivative technology.

The following examples are to illustrate the inventive process and describe the resultant product without restricting the invention:

EXAMPLES

Example 1

(Comparative Example)

In a 400 l autoclave, 17.7 kg of ground wood pulp (moisture: 3.6% by weight; intrinsic viscosity in cuene: 1558 ml/g) and 17.7 kg of ground cotton linters (moisture: 4.2% by weight; intrinsic viscosity in cuene: 1753 ml/g) are rendered inert by evacuation and charging with nitrogen. A mixture of 52.9 kg of dimethyl ether and 2.0 mol eq of chloromethane is then metered into the reactor. 2.2 mol eq of sodium hydroxide in the from of a 50% strength aqueous sodium hydroxide solution are then sprayed onto the cellulose with mixing in approximately 10 minutes. Over the course of the entire reaction phase the reaction system is further mixed. It is alkalized for a further 35 minutes. Addition of the alkali metal hydroxide solution with the subsequent alkalization proceed with a temperature rise of approximately 28° C. to approximately 38° C. Then, 0.66 mol eq of ethylene oxide are added to the reactor over the course of approximately 25 min. The mixture is heated in the course of this to 60 to 63° C. After mixing has been carried out for a further 25 minutes at this temperature, the mixture is heated in the course of 25 min to 78 to 82° C. Reaction is then continued for a further 60 minutes at this temperature. At this temperature, in the course of 8 minutes 2.0 mol eq of chloromethane are added to the reactor. The reaction is then continued for a further 12 minutes at the same temperature. The volatile constituents are distilled off and the reactor is evacuated.

The crude product is subjected to washing with hot water, is then dried and ground.

The degree of substitution of the resultant methylhydroxyethyl cellulose by methyl groups (DS-M) was 1.48, the degree of substitution by hydroxyethyl groups (MS-HE) was 0.40. The NaCl content was 2.3% by weight.

Example 2

As for the synthesis in Example 1, but following the alkalization, 0.001 mol eq of epichlorohydrin dissolved in 2.5 l of dimethoxyethane are added to the reactor in the course of 5 minutes.

The degree of substitution of the resultant irreversibly crosslinked methylhydroxyethyl cellulose by methyl groups (DS-M) was 1.42, and the degree of substitution by hydroxyethyl groups (MS-HE) was 0.43. The NaCl content is 3.6% by weight.

Measurements for the Examples

The methylhydroxyethyl celluloses (MHEC) from Example 1 (measurement 1) and Example 2 (measurement 2) were dissolved in water: 1.5 parts by weight of MHEC and 98.5 parts by weight of water.

The dissolution process is the same for all measurements and examples: the weighed amount of cellulose ether is slowly dispersed in the previously weighed amount of solvent at room temperature with stirring to avoid the formation of lumps. The round glass vessel used as container for the solution is tightly sealed with a lid and shaken several times by hand to distribute the still undissolved portions of cellulose ether. The further dissolution process takes place in the course of 24 hours, the round glass vessel being rotated slowly horizontally about its longitudinal axis. In this manner all parts of the interior of the glass vessel are continually wetted by the liquid.

After the dissolution operation, the glass vessel containing the cellulose ether solution is allowed to stand upright for some hours in order that any air bubbles distributed in the solution ascend and can escape from the solution. Rheological characterization of the cellulose ether solution is then carried out; the procedure is the same for all measurements and examples: directly before the test with the rheometer the glass vessel is opened and the required amount of cellulose ether solution is withdrawn from the glass vessel and charged into the measuring apparatus of the rheometer. The measuring apparatus is run into the position required to carry out the measurement. Before starting measurement, the time required for the cellulose ether solution in the measuring apparatus to reach a temperature of 20° C. is allowed to elapse; temperature control is performed in accordance with the temperature display of the rheometer. The deviations owing to the uncertainty in the calibration of the temperature measurement are small and, for a temperature display of 20° C., are a maximum of ±1° C. The variation in temperature display during the measurement is a maximum of ±0.2° C.

During measurement the angular frequency $\omega$ is changed in such a manner that there are in total 6 measured points in the range of $\omega$ from $0.1\ \text{s}^{-1}$ to $1\ \text{s}^{-1}$. The deformation amplitude $\gamma_0$ in this case is between 0.0025 and 0.0075, which was sufficiently small in all observed cases to determine the material functions storage modulus G' and loss modulus G" reliably in the linear viscoelastic range.

The results of the rheological measurement 1 for Example 1 (comparative example) are listed in Table 1:

Measurement 1

TABLE 1

Linear viscoelastic material functions storage modulus G' and loss modulus G" as a function of the angular frequency ω for the methylhydroxyethyl cellulose from Example 1 (comparative example)

| ω<br>Unit: s$^{-1}$ | G'<br>Unit: Pa | G"<br>Unit: Pa |
|---|---|---|
| 0.1 | 6.64 | 13.2 |
| 0.159 | 9.78 | 17.9 |
| 0.251 | 14.8 | 23.4 |
| 0.398 | 21.5 | 30.4 |
| 0.632 | 30.6 | 37.7 |
| 1 | 42.4 | 47.6 |

Rheometer: Universal Dynamic Spectrometer UDS 200 from Physica Messtechnik GmbH, Stuttgart, Germany
Measuring apparatus: Cone/plate of 50 mm diameter, cone of 1° cone angle and 0.05 mm flattening of the cone point The data are further evaluated in such a manner that the exponents n and m of the relationships (1) $G' \propto \omega^n$ (storage modulus is proportional to the angular frequency to the power n)

and (2) $G'' \propto \omega^m$ (loss modulus is proportional to the angular frequency to the power m)

are determined by carrying out a regression analysis for the logarithm of the storage modulus G' (log G') as a function of the logarithm of the angular frequency ω (log ω), where the gradient of the line corresponds to the exponent n, and by carrying out a regression analysis for the logarithm of the loss modulus G" (log G") as a function of the logarithm of the angular frequency ω (log ω), where the gradient of the line corresponds to the exponent m. The results of this regression analysis for Example 1 (comparative example) are given in Table 2:

TABLE 2

Regression analysis of log G' against log ω and log G" against log ω for the methylhydroxyethyl cellulose from Example 1 (comparative example), data G', G" and ω from Table 1

| log ω | log G' | log ω | log G" |
|---|---|---|---|
| −1 | 0.8222 | −1 | 1.1206 |
| −0.7986 | 0.9903 | −0.7986 | 1.2529 |
| −0.6003 | 1.1702 | −0.6003 | 1.3692 |
| −0.4001 | 1.3324 | −0.4001 | 1.4829 |
| −0.1993 | 1.4857 | −0.1993 | 1.5763 |
| 0 | 1.6273 | 0 | 1.6776 |

Gradient: 0.8107
R: 0.9992
The gradient corresponds to the exponent n of equation (1)
The regression was performed using the known principle of the minimum sum of squares of the errors. R is a coefficient for the quality of the regression and should always be greater than 0.95.

Gradient: 0.5528
R: 0.9982
The gradient corresponds to the exponent m of equation (2)
The regression was performed using the known principle of the minimum sum of squares of the errors. R is a coefficient for the quality of the regression and should always be greater than 0.95.

For the methylhydroxyethyl cellulose from Example 1 (comparative example), this gives a ratio of n to m of 1.47 (0.8107/0.5528); the product does not have gel-like rheological properties.

Measurement 2

The results of rheological measurement 2 for Example 2 are given in Table 3:

TABLE 3

Linear viscoelastic material functions storage modulus G' and loss modulus G" as a function of angular frequency ω for the methylhydroxyethyl cellulose from Example 2

| ω<br>Unit: s$^{-1}$ | G'<br>Unit: Pa | G"<br>Unit: Pa |
|---|---|---|
| 0.1 | 26.5 | 17.8 |
| 0.159 | 31.6 | 20.9 |
| 0.251 | 38.1 | 25.6 |
| 0.398 | 45.1 | 29.9 |
| 0.632 | 54.3 | 35.7 |
| 1 | 64.5 | 41.3 |

Rheometer: Universal Dynamic Spectrometer UDS 200 from Physica Messtechnik GmbH, Stuttgart, Germany
Measuring Cone/plate of 50 mm diameter, cone of 1° cone apparatus: angle and 0.05 mm flattening of the cone point The results of the regression analysis for measurement 2 are given in Table 4:

TABLE 4

Regression analysis of log G' against log ω and log G" against log ω for the methylhydroxyethyl cellulose from Example 2, data G', G" and ω from Table 3

| log ω | log G' | log ω | log G" |
|---|---|---|---|
| −1 | 1.4232 | −1 | 1.2504 |
| −0.7986 | 1.4997 | −0.7986 | 1.3201 |
| −0.6003 | 1.5809 | −0.6003 | 1.4082 |
| −0.4001 | 1.6542 | −0.4001 | 1.4757 |
| −0.1993 | 1.7348 | −0.1993 | 1.5527 |
| 0 | 1.8096 | 0 | 1.6160 |

Gradient: 0.3873
R: 0.9999
The gradient corresponds to the exponent n of equation (1)
The regression was performed using the known principle of the minimum sum of squares of the errors. R is a coefficient for the quality of the regression and should always be greater than 0.95.

Gradient: 0.3706
R: 0.9991
The gradient corresponds to the exponent m of equation (2)
The regression was performed using the known principle of the minimum sum of squares of the errors. R is a coefficient for the quality of the regression and should always be greater than 0.95.

For the methylhydroxyethyl cellulose from Example 2, this thus gives a ratio of n to m of 1.05 (0.3873/0.3706). The product does have gel-like rheological properties.

Example 3

In a 400 l autoclave, 17.8 kg of ground wood pulp (moisture: 4.2% by weight; intrinsic viscosity in cuene: 1194 ml/g) and 17.5 kg of ground cotton linters (moisture: 5.3% by weight; intrinsic viscosity in cuene: 1343 ml/g) are rendered inert by evacuation and charging with nitrogen. A mixture of 65.4 kg of dimethyl ether and 16.2 kg of chloromethane is then metered into the reactor. In addition, 0.003 mol eq of epichlorohydrin dissolved in 5 kg of chloromethane are metered into the reactor. Then 2.5 mol eq of sodium hydroxide in the form of a 50% strength by weight aqueous sodium hydroxide solution are sprayed onto the cellulose with mixing in the course of approximately 10 minutes. Over the course of the entire reaction phase, the reaction system is further admixed. It is alkalized for a further 25 minutes. The addition of the alkali metal hydroxide solution and the subsequent alkalizing proceed with a temperature rise of approximately 25° C. to approximately 38° C. The mixture is then heated in the course of 55 minutes to 80 to 85° C. and then kept at this temperature for 80 minutes, where from approximately 58° C., 2.5 mol eq of propylene oxide are metered into the reactor over the course of approximately 80 min. Then, at the same temperature, 37.1 kg of chloromethane are added to the reactor in the course of 30 minutes. The mixture is kept at the same temperature for a further 10 minutes and then a further 2.0 mol eq of sodium hydroxide in the form of 50% strength by weight aqueous sodium hydroxide solution are sprayed into the reaction mixture in the course of approximately 60 minutes. The reaction is then continued for a further 30 minutes at this temperature. The volatile constituents are distilled off and the reactor is evacuated.

The crude product is subjected to a washing with hot water, then dried and ground.

The degree of substitution of the resultant irreversibly crosslinked methylhydroxypropyl cellulose (MHPC) by methyl groups (DS-M) was 1.83, the degree of substitution by hydroxypropyl groups (MS-HP) was 0.97. The NaCl content was 0.7% by weight.

Measurement 3

The methylhydroxypropyl cellulose from Example 3 was dissolved in water: 1.5 parts by weight of MHPC and 98.5 parts by weight of water. The rheological measurement was carried out as described but using a rheometer model RS 600 from Thermo Haake GmbH, Karlsruhe, Germany using a cone/plate measuring apparatus of 60 mm diameter, cone of 1° cone angle and 0.05 mm flattening of the cone peak. The evaluation gave a ratio of n to m of 1.14.

Measurement 4

The MHPC from Example 3 was dissolved in a solvent of 98 parts by weight of water and 2 parts by weight of sodium hydroxide per 100 parts by weight of solvent: 1.5 parts by weight of MHPC and 98.5 parts by weight of solvent. The rheological measurement was carried out as described in measurement 3. The evaluation gave a ratio of n to m of 0.95.

Measurement 5

The MHEC from Example 2 was dissolved in a solvent of 98 parts by weight of water and 2 parts by weight of sodium hydroxide per 100 parts by weight of solvent: 1.5 parts by weight of MHEC and 98.5 parts by weight of solvent. The rheological measurement was carried out as described in measurement 2. The evaluation gave a ratio of n to m of 1.03.

Comparison of measurement 3 and measurement 4 shows that the MHPC from Example 3, for which, using a solution in water, gel-like properties were found (n/m=1.14), also possesses gel-like properties (n/m=0.95) in a solution in a solvent of 98 parts by weight of water and 2 parts by weight of sodium hydroxide per 100 parts by weight of solvent. The mean of the ratio of n to m for the two solvents is 1.045. The difference between the ratios of n to m from the two solvents is 0.19; this difference corresponds to approximately 18 of 100, based on the mean of the ratios of n to m for the two solvents.

Comparison of measurement 2 and measurement 5 shows that the MHEC from Example 2, for which, using a solution in water, gel-like properties were found (n/m=1.05), also possesses gel-like properties (n/m=1.03) in a solution in a solvent of 98 parts by weight of water and 2 parts by weight of sodium hydroxide per 100 parts by weight of solvent. The mean of the ratio of n to m from the two solvents is 1.04. The difference between the ratios of n to m from the two solvents is 0.02; this difference corresponds to approximately 2 of 100 based on the mean of the ratios of n to m for the two solvents.

What is claimed is:

1. A process for preparing a cellulose derivative having gel-like rheological properties in aqueous solution, comprising:
    a) alkanizing cellulose with aqueous alkali metal hydroxide in the presence of a suspension medium;
    b) reacting the alkalized cellulose with one or more alkylene oxides, thereby forming an alkalized cellulose;
    c) reacting the alkalized cellulose of step (b) with an alkyl halide present in the suspension medium;
    d) reacting subsequently or simultaneously with step (c) the alkalized cellulose of step (c) with a crosslinklng agent in an amount of 0.0001 to 0.05 eq. where the unit "eq" represents the molar ratio of crosslinking agent relative to the anhydroglucose unit (AGU) of the cellulose used, thereby forming an irreversibly crosslinked cellulose derivative;
    e) optionally adding a member selected from the group consisting of alkali metal hydroxide, alkylating agent and combinations thereof;
    f) optionally separating off the irreversibly crosslinked cellulose derivative from the reaction mixture; and
    g) optionally purifying and drying the isolated irreversibly crosslinked cellulose derivative.

2. The process of claim 1 wherein in step a), the cellulose is alkalized using aqueous alkali metal hydroxide in the presence of a suspension medium comprising alkyl halide in an amount calculated from the following formula:

[equivalents of alkali metal hydroxide per AGU minus 1.4]

to

[equivalents of alkali metal hydroxide per AGU plus 0.8], and in step e) alkyl halide is added in an amount which is at least the difference between the number of equivalents of alkyl halide per AGU already added and the total amount of alkali metal hydroxide per AGU added, where this amount is a minimum of 0.2 equivalents per AGU, and, optionally, further alkali metal hydroxide.

3. The process of claim 1 wherein the alkyl halide is methyl chloride.

4. The process of claim 1 wherein the crosslinking agent is dissolved in solvent selected from the group consisting of methyl chloride and a mixture of methyl chloride and dimethyl ether.

* * * * *